United States Patent [19]
Kim

[11] Patent Number: 5,299,006
[45] Date of Patent: Mar. 29, 1994

[54] CAPTION VCR AND METHOD OF DISPLAYING A CAPTION SIGNAL IN THE CAPTION VCR

[76] Inventor: Seung K. Kim, 3-405, Poongrim Apt. 31-1, Uman-dong, Jangan-gu, Suwon-si, Kyunggi-do, Rep. of Korea

[21] Appl. No.: 798,760

[22] Filed: Nov. 27, 1991

[30] Foreign Application Priority Data

Nov. 28, 1990 [KR] Rep. of Korea ............... 19380/1990

[51] Int. Cl.$^5$ ...................... H04N 7/08; H04N 5/278; H04N 5/445
[52] U.S. Cl. ..................................... 348/571; 348/473; 348/705; 348/725
[58] Field of Search ................. 358/142, 147, 183, 22, 358/188, 21 R, 181; H04N 7/08, 5/445, 7/087, 5/278

[56] References Cited

U.S. PATENT DOCUMENTS 4,218,698  8/1980  Bart et al. ........................ 358/183
4,554,584  11/1985  Elam et al. ...................... 358/147

FOREIGN PATENT DOCUMENTS

0252285  11/1987  Japan ............................ H04N 7/08
0086782   3/1989  Japan ............................ H04N 7/08
0196778   8/1991  Japan ............................ H04N 5/278

Primary Examiner—James J. Groody
Assistant Examiner—Jeffrey S. Murrell
Attorney, Agent, or Firm—Fish & Richardson

[57] ABSTRACT

A caption VCR having a caption decoder, therein, for detecting a caption signal from a broadcasting signal or detecting a caption signal recorded on a VCR tape. The caption VCR normally operates to display a video signal having no caption signal. However, if the caption signal including character and screen data is detected by the caption decoder, the caption VCR displays the caption signal including the character and screen data. Also, a method of displaying the caption signal from the caption decoder together with an audio signal and a video signal in the caption VCR is provided. Therefore, it is convenient for the deaf person or foreign language learner to watch a desired image containing the caption signal on the screen utilizing the caption decoder.

10 Claims, 6 Drawing Sheets

FIG. 3

| MODE \ CONTROL SIGNAL | $\overline{CCS}$ | $\overline{SCS}$ |
|---|---|---|
| CHARACTER | L | L |
| SCREEN | H | L |
| NORMAL | H | H |

* L : LOW
  H : HIGH

CAPTION VCR AND METHOD OF DISPLAYING A CAPTION SIGNAL IN THE CAPTION VCR

BACKGROUND OF THE INVENTION

1. Field of the Invention

The present invention relates in general to a caption video cassette recorder (VCR), and more particularly to a caption VCR having a caption decoder, therein, for detecting a caption signal from a broadcasting signal or detecting the caption signal recorded on a VCR tape and to a method of displaying the caption signal from the caption decoder together with an audio signal and a video signal in the caption VCR.

2. Description of the Relevant Art

For the purpose of further display of a caption signal in a VCR in which an audio signal and a video signal are displayed, a deaf person or a foreign language learner usually detects the caption signal from a broadcasting signal containing the caption signal or detects the caption signal recorded on a VCR tape, utilizing a separate, external caption decoder. Then, the detected caption signal from the caption decoder is displayed together with the audio and video signals in the VCR.

With reference to FIG. 1, there is shown a block diagram of a conventional on-screen display apparatus for a VCR. The illustrated circuit comprises a programmable controller 31 for providing a plurality of control signals necessary to the VCR in accordance with a selection of the user, a radio frequency (RF) converter 32 for receiving an external broadcasting signal through a receiving antenna ANT1 and outputting a desired signal through a transmitting antenna ANT2 under a control of the programmable controller 31, a tuner 33 for tuning the broadcasting signal from the RF converter 32 to a broadcasting channel required by the user under a control of the programmable controller 31, demodulating the tuned broadcasting signal to divide it into a video signal and an audio signal AU and outputting the divided video signal and audio signal AU, a switching circuit 34 for selectively outputting one of the video signal from the tuner 33 and an external video signal under a control of the programmable controller 31, a luminance/chrominance (Y/C) processing circuit 35 for video-processing an output signal from the switching circuit 34 or a self-video signal to be played back under a control of the programmable controller 31, an on-screen display unit 36 for displaying an output signal from the Y/C processing circuit 35 and an external caption signal under a control of the programmable controller 31, a buffer 37 for buffering an output signal from the on-screen display unit 36 and outputting the buffered signal through the RF converter 32 and through a video output jack VOJ externally, and a separate caption decoder 38 for detecting the caption signal from the broadcasting signal or the caption signal recorded on a VCR tape and the detected caption signal to the on-screen display unit 36.

The operation of the on-screen display apparatus for the VCR with the above-mentioned construction will now be described.

The programmable controller 31 provides a plurality of control signals necessary to the VCR in accordance with the selection of the user.

The radio frequency (RF) converter 32 receives the external broadcasting signal through the receiving antenna ANT1 and transmits the received broadcasting signal to the tuner 33. Also, the RF converter 32 outputs a desired signal through the transmitting antenna ANT2 in accordance with a control signal TV/VCR from the programmable controller 31. Namely, in a television (TV) mode, the RF converter 32 outputs the broadcasting signal inputted through the receiving antenna ANT1 directly through the transmitting antenna ANT2 externally, otherwise, in a VCR mode, the RF converter 32 modulates the video signal and caption signal from the buffer 37 to a broadcasting frequency required by the user and outputs the modulated video signal and caption signal through the transmitting antenna ANT2.

The tuner 33 tunes the broadcasting signal from the RF converter 32 to a broadcasting channel required by the user in accordance with a control signal D1 from the programmable controller 31, demodulates the tuned broadcasting signal to divide it into the video signal and the audio signal AU and outputs the divided video signal and audio signal AU. Then, the audio signal AU is transferred to an audio processing circuit (not shown) and the video signal is transferred to the switching circuit 34.

The switching circuit 34 selectively outputs one of the video signal from the tuner 33 and an external video signal through a video input jack VIJ to the Y/C processing circuit 35 in accordance with a control signal Tuner/Line from the programmable controller 31. Namely, in a Tuner mode, the switching circuit 34 outputs the video signal from the tuner 33, otherwise, in a Line mode, the switching circuit 34 outputs the external video signal inputted through a video input jack VIJ.

The Y/C processing circuit 35 video-processes the output signal from the switching circuit 34 or a self-video signal to be played back in accordance with a control signal W/EE from the programmable controller 31. Namely, in a W mode, the Y/C processing circuit 35 outputs the self-video signal to be played back. Otherwise, in an EE mode, the Y/C processing circuit 35 outputs the output signal from the switching circuit 34.

The on-screen display unit 36 displays the output signal from the Y/C processing circuit 35 and the caption signal from the separate caption decoder 38 in accordance with a control signal D2 from the programmable controller 31. Namely, upon an enable slate of the control signal D2 from the programmable controller 31, the on-screen display unit 36 displays the output signal from the Y/C processing circuit 35. At this time, if the caption signal is applied from the separate caption decoder 38 during the display of the video signal from the Y/C processing circuit 35, the on-screen display unit 36 stops displaying the video signal from the Y/C processing circuit 35 and displays the caption signal from the separate caption decoder 38. Then, if no further caption signal is applied from the separate caption decoder 38, the on-screen display unit 36 displays the video signal from the Y/C processing circuit 35 again. On the other hand, upon a disable state of the control signal D2 from the programmable controller 31, the on-screen display unit 36 outputs the output signal from the Y/C processing circuit 35 and the caption signal from the separate caption decoder 38 to the buffer 37.

Herein, the broadcasting signal may mean a character multiplex broadcasting signal containing video, audio and caption signals. Also, the video signal from the Y/C processing circuit 35 may contain the caption signal. However, in the conventional VCR, the caption signal cannot be detected from the video signal from the Y/C processing circuit 35 without the separate caption decoder 38.

Therefore, in this manner, the caption signal from the separate caption decoder 38 is displayed together with the video signal and audio signal.

On the other hand, upon receiving the video signal and caption signal from the on-screen display unit 36, the buffer 37 buffers the received video signal and caption signal and then sends the buffered video signal and caption signal to the RF converter 32 and also outputs them through the video output jack VOJ externally.

However, the conventional VCR with the above-mentioned on-screen display apparatus has a disadvantage, in that the caption decoder must be installed on the outside of the VCR, separately from the on-screen display apparatus, in order to detect the caption signal from the broadcasting signal, or character multiplex broadcasting signal, or the caption signal recorded on the VCR tape. For this reason, the deaf person or foreign language learner can not help purchasing the caption decoder separately and connecting the separate caption decoder to the VCR, so as to watch a desired image containing the caption on the screen. Therefore, it is inconvenient for the deaf person or foreign language learner to watch a desired image containing the caption signal on the screen utilizing the separate caption decoder.

SUMMARY OF THE INVENTION

Therefore, the present invention has been made in view of the above problem, and it is an object of the present invention to provide a caption VCR having a caption decoder, therein, for detecting a caption signal from a broadcasting signal or detecting a caption signal recorded on a VCR tape.

It is another object of the present invention to provide a method of displaying the caption signal from the caption decoder together with an audio signal and a video signal in the caption VCR.

In accordance with one aspect of the present invention, there is provided a caption display apparatus for a VCR, comprising: programmable controlling means for providing a plurality of control signals necessary to the VCR under a control of the user; radio frequency converting means for receiving an external broadcasting signal and outputting the received broadcasting signal or a desired signal under a control of said programmable controlling means; tuning means for tuning an output signal from said radio frequency converting means to a broadcasting channel required by the user under a control of said programmable controlling means, demodulating the tuned signal to divide it into a video signal and an audio signal and outputting the divided video signal and audio signal; first switching means for selectively outputting one of the video signal from said tuning means and an external video signal under a control of said programmable controlling means; luminance/chrominance processing means for video-processing an output signal from said first switching means or a self-video signal to be played back under a control of said programmable controlling means; luminance/chrominance detecting means for outputting a desired control signal to said programmable controlling means according to whether an output signal from said luminance/chrominance processing means is present and separating vertical and horizontal synchronous signals from the output signal from said luminance/chromi-nance processing means if the output signal from said luminance/chrominance processing means is present; clamping means for clamping the output signal from said luminance/chrominance processing means at a constant voltage level; noise attenuating means for attenuating a noise contained in the output signal from said luminance/chrominance processing means for the purpose of easiness of decoding of a caption signal from the output signal from said luminance/chrominance processing means; caption decoding means for inputting an output signal from said noise attenuating means and detecting the caption signal containing screen data and character data from the output signal from said noise attenuating means under a control of said programmable controlling means; second switching means for selectively outputting one of an output signal from said clamping means and an output signal from said caption decoding means under a control of said caption decoding means; DC voltage supplying means for supplying a desired DC voltage to said second switching means only when the caption signal from said caption decoding means is applied to said second switching means; on-screen displaying means for displaying an output signal from said second switching means under a control of said programmable controlling means and a control of said luminance/chrominance detecting means; and third switching means for blocking the output signal from said caption decoding means to said second switching means under a control of said programmable controlling means.

In accordance with another aspect of the present invention, there is provided a method of displaying a caption signal in a caption VCR, comprising the steps of: (a) luminance/chrominance-processing a video signal inputted in the VCR; (b) clamping the luminance/-chrominance-processed video signal at a constant voltage level and then displaying the clamped video signal; (c) decoding the luminance/chrominance-processed video signal to detect a caption signal from the luminance/chrominance-processed video signal; and (d) displaying screen data of the caption signal when the screen data of the caption signal is detected and displaying character data of the caption signal when the character data of the caption signal is detected.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of a conventional on-screen display apparatus for a VCR;

FIG. 2 is a block diagram of a caption display apparatus for the VCR in accordance with the present invention;

FIG. 4 is a picture displayed on the screen of an on-screen display unit in FIG. 2 including screen data and character data of a caption signal, in accordance with an embodiment of the present invention, wherein:

DETAILED DESCRIPTION OF PREFERRED EMBODIMENTS

First, a construction of a caption display apparatus for the VCR in accordance with the present invention will be described with reference to FIG. 2.

With reference to FIG. 2, there is shown a block diagram of a caption display apparatus for the VCR in accordance with the present invention. As shown in this drawing, the caption display apparatus of the present invention comprises a programmable controller 1 for providing a plurality of control signals necessary to the VCR in accordance with a control signal D3 from the user, a radio frequency (RF) converter 2 for receiving an external broadcasting signal through a receiving antenna ANT1 and outputting a desired signal through a transmitting antenna ANT2 under a control of the programmable controller 1, a tuner 3 for tuning the broadcasting signal from the RF converter 2 to a broadcasting channel required by the user under a control of the programmable controller 1, demodulating the tuned broadcasting signal to divide it into a video signal and an audio signal AU and outputting the divided video signal and audio signal AU, a first switching circuit 4 for selectively outputting the video signal from the tuner 3 or the external video signal under a control of the programmable controller 1, a luminance/chrominance (Y/C) processing circuit 5 for video-processing an output signal from the switching circuit 4 or a self-video signal to be played back under a control of the programmable controller 1, a Y/C detector 6 for outputting a desired control signal to the programmable controller 1 according to whether an output signal from the Y/C processing circuit 5 is present and separating vertical and horizontal synchronous signals from the output signal from the Y/C processing circuit 5 if the output signal from the Y/C processing circuit 5 is present, a clamping circuit 7 for clamping the output signal from the Y/C processing circuit 5 at a constant voltage level, and a noise attenuator 8 for attenuating a noise contained in the output signal from the Y/C processing circuit 5.

The noise attenuator 8 includes a buffer 9 for buffering the output signal from the Y/C processing circuit 5, a color and noise removing circuit 10 for removing the color and noise contained in an output signal from the buffer 9 to prevent generation of an error character due to the color and noise upon decoding of a caption signal, and a clamping and synchronization correcting circuit 11 for clamping an output signal from the color and noise removing circuit 10 at a constant voltage level and then correcting a synchronization of the clamped signal to suppress a horizontal vibration of a character of the caption signal to be decoded.

Also, the caption display apparatus of the present invention comprises a caption decoder 12 for inputting an output signal from the clamping and synchronization correcting circuit 11 in the noise attenuator 8 and detecting the caption signal containing screen data and character data from the output signal under a control of the programmable controller 1, a second switching circuit 13 for selectively outputting an output signal from the clamping circuit 7 or the output signal from the caption decoder 12 under a control of the caption decoder 12, a DC voltage supplying circuit 14 for supplying a desired DC voltage to the second switching circuit 13 only when the caption signal from the caption decoder 12 is applied to the second switching circuit 13, a buffer 15 for buffering an output signal from the second switching circuit 13, an on-screen display unit 16 for displaying the output signal from the second switching circuit through the buffer 15 or outputting it via a buffer 17 to the R/F converter 2 or through a video output jack VOJ externally under a control of the programmable controller 1 and a control of the Y/C detector 6, a third switching circuit 18 for blocking the output signal from the caption decoder 12 to the second switching circuit 13 under a control of the programmable controller 1, and a reverse voltage preventing circuit 19 for preventing reverse voltages of caption control signals $\overline{SCS}$ and $\overline{CCS}$ from the programmable controller 1.

The second switching circuit 13 includes a first switch 13a for selectively outputting one of the output signal from the clamping circuit 7 and the screen data of the caption signal from the caption decoder 12 under the control of the caption decoder 12, and a second switch 13b for selectively outputting an output signal from the first switch 13a or the character data of the caption signal from the caption decoder 12 output signals from first switch 13a are also transmitted by way of line $S_1+V_1$ to buffer 15 and display unit 16 under the control of the caption decoder 12.

Also, the DC voltage supplying circuit 14 includes a first DC voltage supplying unit 14a for supplying a desired DC voltage to the first switch 13a in the second switching circuit 13 only when the screen data of the caption signal from the caption decoder 12 is applied to the first switch 13a, and a second DC voltage supplying unit 14b for supplying a desired DC voltage to the second switch 13b in the second switching circuit 13 only when the character data of the caption signal from the caption decoder 12 is applied to the second switch 13b.

The third switching circuit 18 includes a third switch 18a for blocking the character data of the output signal from the caption decoder 12 to the second switch 13b in the second switching circuit 13 under the control of the programmable controller 1, and a fourth switch 18b for blocking the screen data of the output signal from the caption decoder 12 to the first switch 13a in the second switching circuit 13 under the control of the programmable controller 1.

On the other hand, between a caption control signal $\overline{SCS}$ output terminal of the programmable controller 1 and the caption decoder 12 are connected a diode D11 and an inverter gate I11 in series. Also, between a caption control signal $\overline{CCS}$ output terminal of the programmable controller 1 and the caption decoder 12 are connected a diode D12 and an inverter gate I12 in series.

Also, the reverse voltage preventing circuit 19 is provided with a pair of diodes D13 and D14 to prevent reverse voltages of the caption control signals $\overline{SCS}$ and $\overline{CCS}$ from the programmable controller 1. The diode 13 is connected between connection of the diode D12 with the inverter gate I12 and the third switch 18a in the third switching circuit 18. The diode D14 is connected between connection of the diode D11 with the inverter gate I11 and the fourth switch 18b in the third switching circuit 18.

Now, the operation of the caption display apparatus with the above mentioned construction in accordance with the present invention will be described in detail with reference to FIGS. 3 through 6.

The programmable controller 1 provides a plurality of control signals necessary to the VCR in accordance with the selection of the user.

The radio frequency (RF) converter 2 receives the external broadcasting signal through the receiving antenna ANT1 and transmits the broadcasting signal to the tuner 3.

Herein, the broadcasting signal may mean a character multiplex broadcasting signal containing video, audio and caption signals. Also, the video signal from the Y/C processing circuit 5 may contain the caption.

The tuner 3 tunes the broadcasting signal from the RF converter 2 to a broadcasting channel required by the user in accordance with a control signal D1 from the programmable controller 1, demodulates the tuned broadcasting signal to divide it into the video signal and the audio signal AU and outputs the divided video signal and audio signal AU. Then, the audio signal AU is transferred to an audio processing circuit (not shown) and the video signal is transferred to the first switching circuit 4.

The first switching circuit 4 selectively outputs the video signal from the tuner 3 or an external video signal input through a video input jack VIJ to the Y/C processing circuit 5 in accordance with a control signal Tuner/Line from the programmable controller 1. Namely, in a Tuner mode, the first switching circuit 4 outputs the video signal from the tuner 3, otherwise, in a Line mode, the first switching circuit 4 outputs the external video signal input through a video input jack VIJ.

The Y/C processing circuit 5 video-processes the output signal from the first switching circuit 4 or a self-video signal to be played back in accordance with a control signal W/EE from the programmable controller 1. Namely, in a W mode, the Y/C processing circuit 5 outputs the self-video signal to be played back. Otherwise, in an EE mode, the Y/C processing circuit 5 outputs the output signal from the first switching circuit 4.

The Y/C detector 6 outputs a desired control signal to the programmable controller I according to whether the output signal, or video signal from the Y/C processing circuit 5 is present. Namely, upon receiving the video signal from the Y/C processing circuit 5, the Y/C detector 6 outputs a high control signal DH to the programmable controller 1, which indicates that the video signal from the Y/C processing circuit 5 is present. Also, the Y/C detector 6 separates vertical and horizontal synchronous signals Vsync and Hsync from the video signal from the Y/C processing circuit 5, which are then applied to the on-screen display unit 16 for adjustment of a synchronization of the video signal. The vertical,-and horizontal synchronous signals Vsync and Hsync will later be mentioned in detail.

Figure 5A:
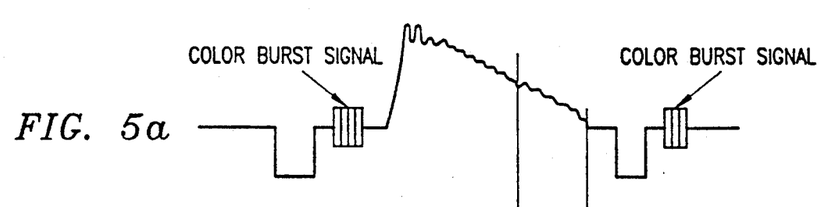
FIG. 5a through 5e are waveform diagrams illustrating respectively levels of the screen data and character data of the caption signal.

The clamping circuit 7 clamps the video signal outputted from the Y/C processing circuit 5 at a constant voltage level and outputs the clamped video signal as shown in FIG. 5a to the second switching circuit 13.

On the other hand, the video signal from the Y/C processing circuit 5 is applied to the buffer 9 in the noise attenuator 8, which functions as a low pass filter.

Therefore, as mentioned above, the video signal from the Y/C processing circuit 5 is applied respectively to the Y/C detector 6, the clamping circuit 7 and the buffer 9 in the noise attenuator 8. The video signal from the clamping circuit 7, in which the caption signal is not detected, is applied to the on-screen display unit 16 through the second switching circuit 13.

Upon receiving the buffered video signal from the buffer 9, the color and noise removing circuit 10 in the noise attenuator 8 removes the color and noise contained in the video signal from the buffer 9 to prevent generation of an error character due to the color and noise upon decoding of the caption signal. Then, the clamping and synchronization correcting circuit 11 in the noise attenuator 8 clamps the color and noise removed video signal from the color and noise removing circuit 10 at a constant voltage level and then corrects a synchronization of the clamped video signal to suppress a horizontal vibration of a character of the caption signal to be decoded. In result, the noise attenuator 8 enables the caption decoder 12 to readily find out the caption signal contained in the video signal.

Figure 5B:
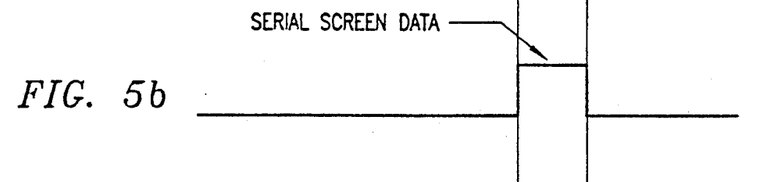

If the caption control signal, or screen control signal $\overline{SCS}$ from the programmable controller 1 is active "low", the fourth switch 18b in the third switching circuit 18 is turned off and a high signal through the inverter gate I11 is applied to the caption decoder 12. As a result, the serial screen data of the caption signal as shown in FIG. 5b is outputted from the caption decoder 12, which is then applied to the first switch 13a in the second switching circuit 13.

Figure 5C:
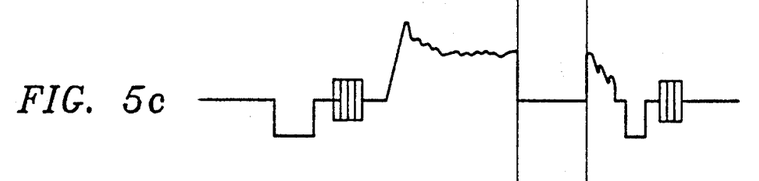

In the first switch 13a in the second switching circuit 13, a movable terminal c1 is normally connected to one fixed terminal a1 for applying the video signal from the clamping circuit 7 to the second switch 13b in the second switching circuit 13. On the other hand, upon application of the screen data of the caption signal from the caption decoder 12, the movable terminal c1 of the first switch 13a is connected to the other fixed terminal b1 thereof. This connection of the movable terminal c1 to the other fixed terminal b1 in the first switch 13a is established only during the application of the screen data of the caption signal from the caption decoder 12. At this time, a desired DC voltage fixing a level of the screen data of the caption signal is applied to the first switch 13a in the second switching circuit 13 from the first DC voltage supplying unit 14a in the DC voltage supplying circuit 14 which is connected to the other fixed terminal b1 of the first switch 13a. As a result, the screen data of the caption signal of frequency as shown in FIG. 5c is outputted from the first switch 13a to the second switch 13b in the second switching circuit 13 and to the buffer 15 and the on screen display unit 16 by way of line $S_1+V_1$.

On the other hand, if the caption control signal, or screen control signal $\overline{SCS}$ from the programmable controller 1 is inactive "high", the fourth switch 18b in the third switching circuit 18 is turned on, thereby allowing the screen data output of the caption decoder 12 to be connected to the ground. Also, a low signal through the inverter gate I11 is applied to the caption decoder 12. As a result, no screen data of the caption signal is outputted from the caption decoder 12 and thus the first switch 13a in the second switching circuit 13 outputs the video signal from the clamping circuit 7 directly to line $S_1+V_1$ and the second switch 13b in the second switching circuit 13.

Also, if the caption control signal, or character control signal $\overline{CCS}$ from the programmable controller 1 is active "low", the third switch 18a in the third switching circuit 18 is turned off and a high signal through the inverter gate I12 is applied to the caption decoder 12.

Figure 5D:
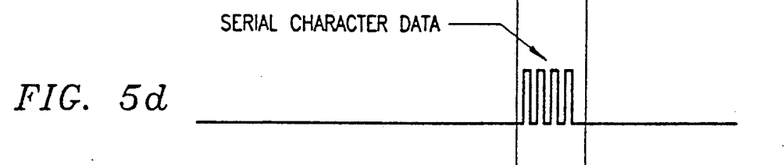

As a result, the serial character data of the caption signal as shown in FIG. 5d is outputted from the caption decoder 12, which is then applied to the second switch 13b in the second switching circuit 13.

FIGS. 5b and 5d are waveform diagrams illustrating respectively levels of the serial screen data and serial character data of the caption signal output from the caption decoder 12.

In the second switch 13b in the second switching circuit 13, a movable terminal c2 is normally connected to one fixed terminal a2 for applying the output signal from the first switch 13a, i.e., the video signal from the clamping circuit 7 or the screen data of the caption signal from the caption decoder 12 to the on-screen display unit 16 therethrough. On the other hand, upon application of the character data of the caption signal from the caption decoder 12, the movable terminal c2 of the second switch 13b is connected to the other fixed terminal b2 thereof. This connection of the movable terminal c2 to the other fixed terminal b2 in the second switch 13b is established only during the application of the character data of the caption signal from the caption decoder 12. At this time, a desired DC voltage fixing a level of the character data of the caption signal is applied to the second switch 13b in the second switching circuit 13 from the second DC voltage supplying unit 14b in the DC voltage supplying circuit 14 which is connected to the other fixed terminal b2 of the second switch 13b. As a result, the character data of the caption signal is outputted from the second switch 13b to the on-screen display unit 16 through the buffer 15 if screen data is detected by detector 12, the screen data of the caption signal is output from the first switch 13a to the buffer 15 and the on screen display unit 16 by way of line $S_1+V_1$.

On the other hand, if the caption control signal, or character control signal $\overline{CCS}$ from the programmable controller 1 is inactive "high", the third switch 18a in the third switching circuit 18 is turned on, thereby allowing the character data output of the caption decoder 12 to be connected to the ground. Also, a low signal through the inverter gate I12 is applied to the caption decoder 12. As a result, no character data of the caption signal is outputted from the caption decoder 12 and thus the second switch 13b in the second switching circuit 13 outputs the output signal from the first switch 13a, i.e., the video signal from the clamping circuit 7 or the screen data of the caption signal from the caption decoder 12 directly to the on-screen display unit 16 through the buffer 15. At the same time, the output signal from the first switch 13a is transmitted also by way of line $S_1+V_1$ to the buffer 15 and display unit 16.

Figure 5E:
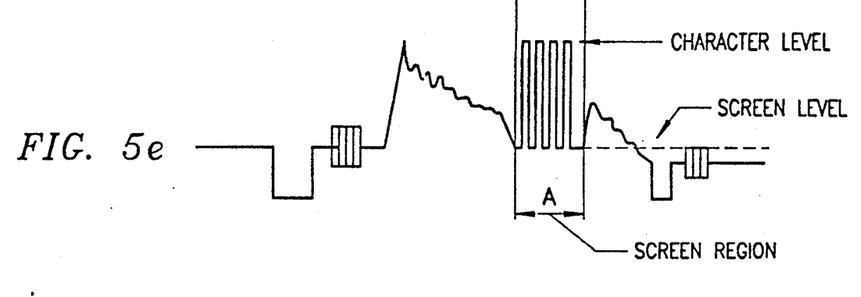

FIG. 5e is a waveform diagram illustrating levels of the serial screen data and serial character data of the caption signal outputted from the second switch 13b.

Figure 3:
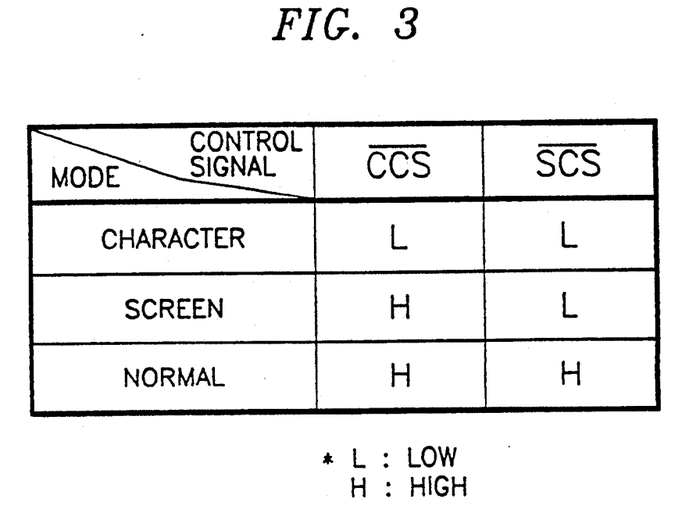
FIG. 3 is a logic table illustrating logic states of caption control signals from a programmable controller in FIG. 2.

Accordingly, as shown in FIG. 3 in which is shown a logic table illustrating logic states of the caption control signals $\overline{CCS}$ and $\overline{SCS}$ from the programmable controller 1, in accordance with the logic states of the caption control signals $\overline{CCS}$ and $\overline{SCS}$, the second switch 13b in the second switching circuit 13 outputs only the normal video signal in a normal mode, or the screen data of the caption signal being added to the normal video signal in a screen mode, or the character data of the caption signal being added to the normal video signal and the screen data from line $S_1+V_1$ in a character mode.

Figure 4A:
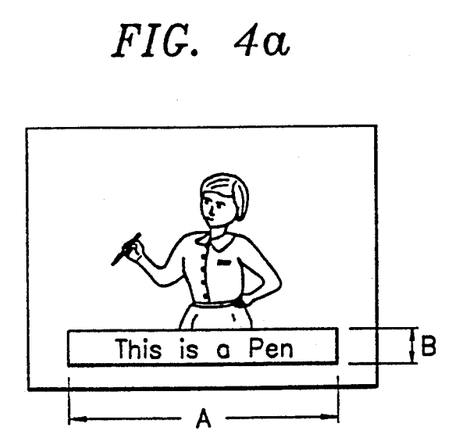
FIG. 4a illustrates a picture displayed on the screen including screen data and character data of the caption signal.
Figure 4B:
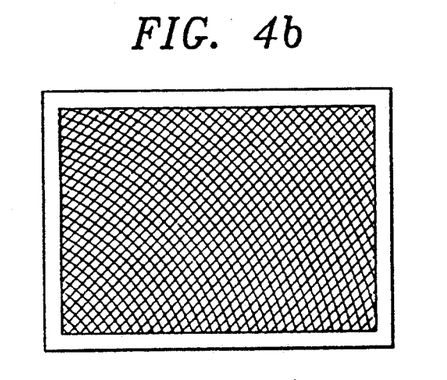
FIG. 4b illustrates an area on the screen in which the screen data and character data of the caption signal is displayed at the maximum.

FIG. 4a illustrates a picture displayed on the screen of the on-screen display unit 16 including the screen data and character data of the caption signal and FIG. 4b illustrates an area on the screen in which the screen data and character data of the caption signal is displayed at the maximum.

For example, characters "This is a pen" corresponds to the character level shown in FIG. 5e. The lateral portion A of the screen area (A+B) surrounding the characters "This is a pen" corresponds to the screen region shown in FIG. 5e. As a result, the screen data of the caption signal outputted from the caption decoder 12 is displayed on the screen as a black color of the whole area on the screen or the rectangular area surrounding the characters "This is a pen" as shown in FIGS. 4b and 4a. The character data of the caption signal is displayed on the screen by a squarewave pulse shown in FIG. 5e. Namely, the character data of the caption signal is displayed as a white color when the squarewave pulse is high, while as a black color when the squarewave pulse is low, as indicated as the characters "This is a pen" shown in FIGS. 4a (wherein, for easiness of understanding of the screen data and character data of the caption signal with reference to FIG. 4a, the screen data is shown as the white color and the character data is shown as the black color).

On the other hand, since the caption decoder 12 outputs only screen data of the caption signal, as mentioned above, if the user selects the screen mode by means of a remote controller 1a, the characters "This is a pen" as shown in FIG. 4a is not displayed on the screen and the corresponding area is displayed as the black color. Therefore, the user may intentionally not watch the characters on the screen for the purpose of hearing of the audio signal. Also, the modes in the logic table shown in FIG. 3 can be selected by the user utilizing the remote controller 1a.

In the normal mode, the movable terminals c1 and c2 of the first and second switches 13a and 13b in the second switching circuit 13 are connected respectively to the fixed terminals a1 and a2 since no caption signal from the caption decoder 12 is outputted to the first and second switches 13a and 13b. As a result, only video signal from the clamping circuit 7 is outputted through the first and second switches 13a and 13b to the on-screen display unit 16. For this reason, in the normal mode, the character multiplex broadcasting function cannot be performed.

The buffer 15 functions to buffer the output signal from the second switch 13b in the second switching circuit 13 and from line $S_1+V_1$ and output the buffered signal to the on-screen display unit 16.

The on-screen display unit 16 displays the output signal, i.e., video signal or caption signal from the second switch 13b in the second switching circuit 13 and $S_1+V_1$ inputted through the buffer 15 in accordance with a control signal D2 from the programmable controller 1. Namely, upon an enable state of the control signal D2 from the programmable controller 1, the on-screen display unit 16 displays the output signal from the second switch 13b and $S_1+V_1$. At this time, if the caption signal, i.e., character data and screen data is applied from the second switch 13b and $S_1+V_1$ during the display of the video signal previously outputted from the second switch 13b, the on-screen display unit 16 stops displaying the video signal and displays the caption signal. Then, if no further caption signal is applied from the second switch 13b and $S_1+V_1$, the on-screen display unit 16 displays the video signal from the second switch 13b again. On the other hand, upon a disable state of the control signal D2 from the programmable controller 1, the on-screen display unit 16 outputs the output signal from the second switch 13b and $S_1+V_1$ inputted through the buffer 15 to the buffer 17. Also, in the on-screen display unit 16, the synchronization of the video signal including the caption signal is adjusted in accordance with the vertical and horizontal synchronous signals Vsync and Hsync outputted from Y/C detector 6. If no vertical and horizontal synchronous signals Vsync and Hsync are outputted from Y/C detector 6, the synchronization of the video signal including the caption signal is self-adjusted in the on-screen display unit 16.

Also, the buffer 17 buffers the received video signal including the caption signal and then sends the buffered video signal including caption signal to the RF converter 2 and also outputs them through the video output jack VOJ externally.

In other words, the RF converter 2 outputs a desired signal through the transmitting antenna ANT2 in accordance with a control signal TV/VCR from the programmable controller 1. Namely, in a television (TV) mode, the RF converter 2 outputs the external broadcasting signal inputted through the receiving antenna ANT1 directly through the transmitting antenna ANT2 externally, otherwise, in a VCR mode, the RF converter 2 modulates the video signal including the caption signal from the buffer 17 and the audio signal from the audio processing circuit (not shown) to a broadcasting frequency required by the user and outputs the modulated video signal including caption signal and audio signal through the transmitting antenna ANT2.

The reverse voltage preventing circuit 19 functions to prevent reverse voltages of the caption control signals $\overline{SCS}$ and $\overline{CCS}$ from the programmable controller 1 when they are active "low".

The programmable controller 1 may be under a remote control of the remote controller 1a. Even in a case where the system is in an operation other than speed change modes such as extend play (EP) mode, standard play (SP) mode and long play (LP) mode, the programmable controller 1 outputs a change speed signal VS of high level, thereby enabling the third and fourth switches 18a and 18b in the third switching circuit 18 to be shorted. As a result, the screen data and character data of the caption signal from the caption decoder 12 cannot be transferred to the second switching circuit 13.

Figure 6A:
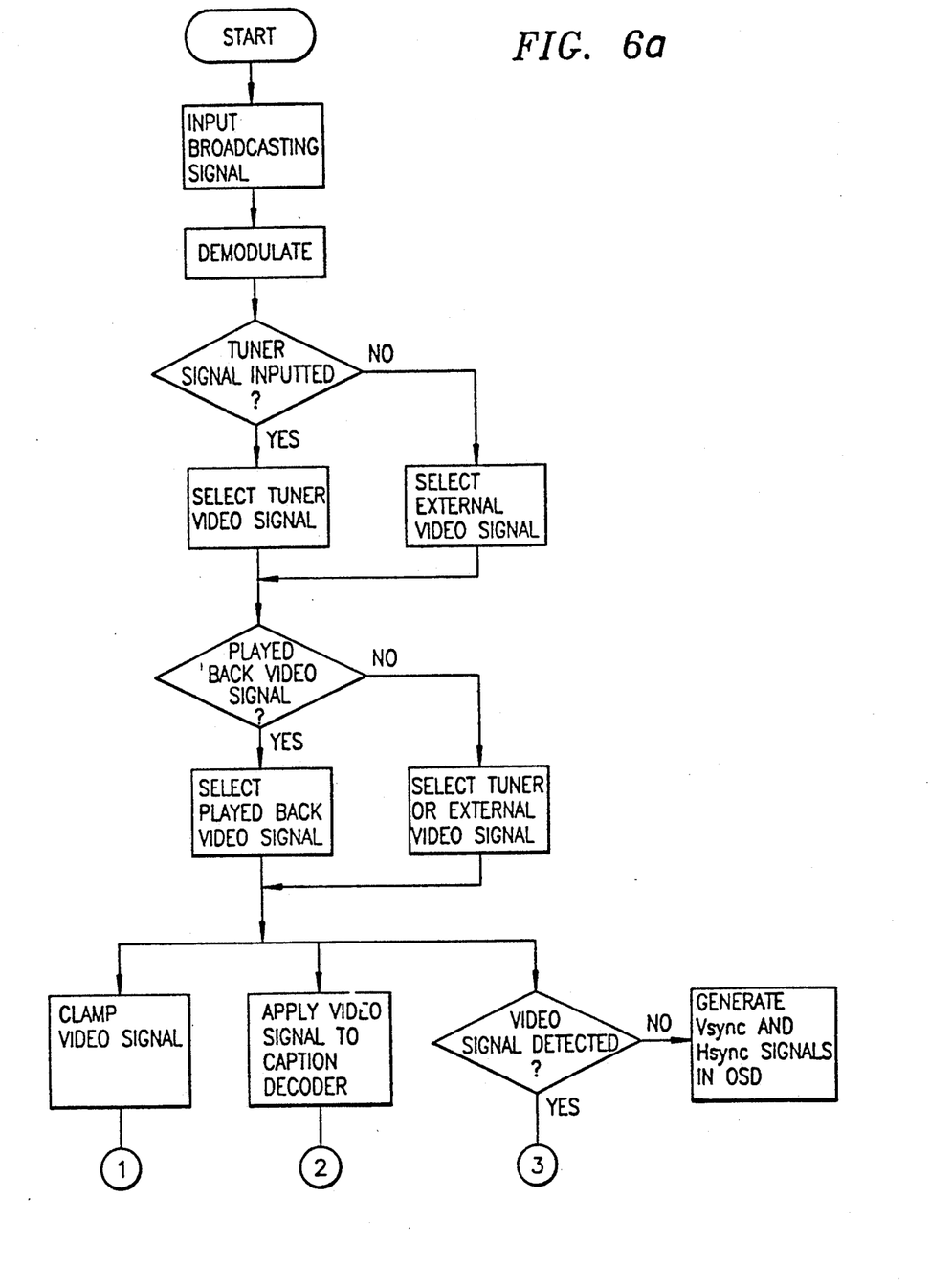
FIG. 6 is a flowchart illustrating the operation of the caption display apparatus in FIG. 2.
Figure 6B:
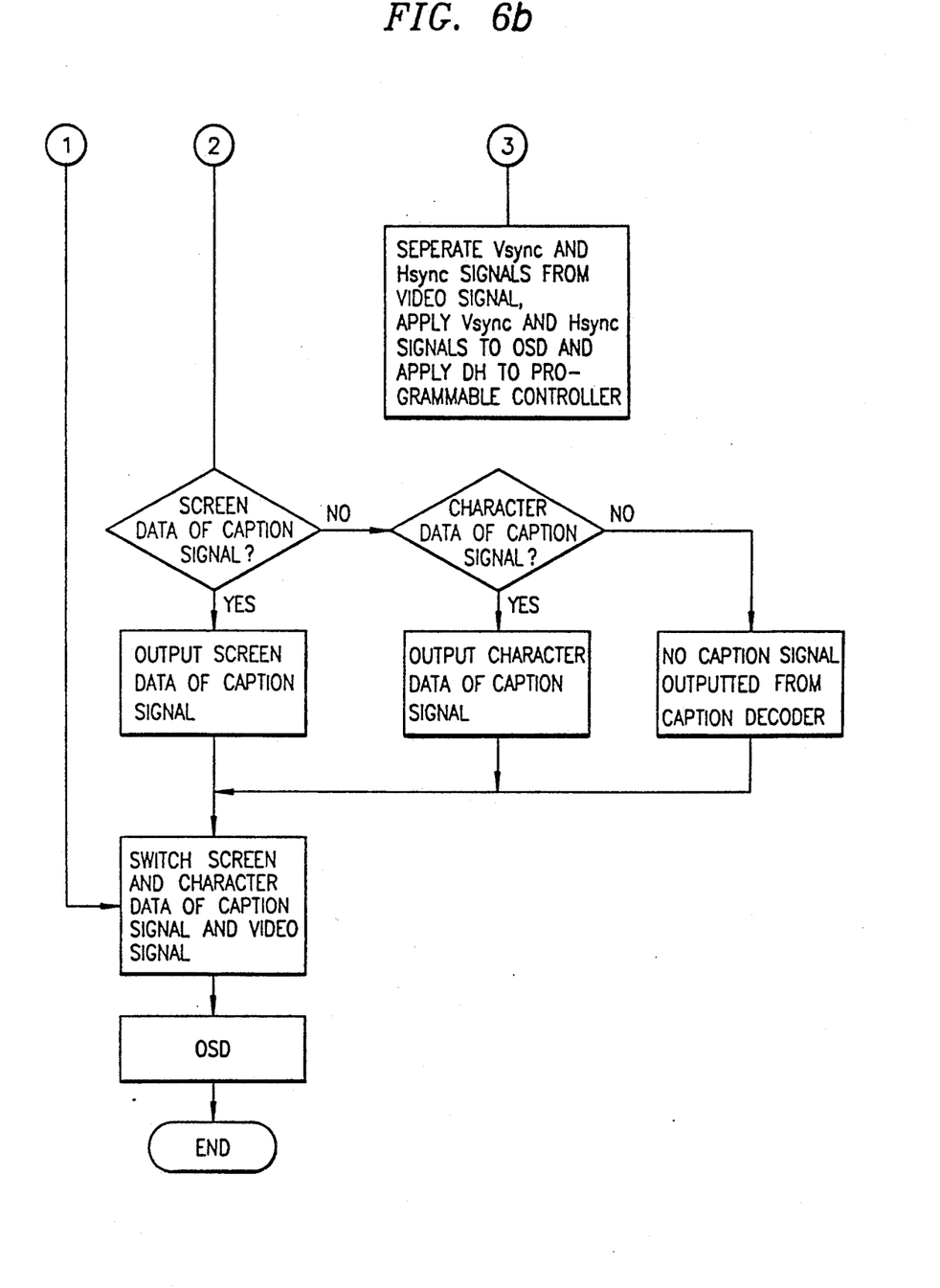

With reference to FIG. 6, there is shown a flowchart illustrating the operation of the caption display apparatus of the present invention.

First, upon receiving the external broadcasting signal containing the video signal and audio signal, the RF converter 2 transmits the received broadcasting signal to the tuner 3.

The tuner 3 tunes the broadcasting signal from the RF converter 2 to a broadcasting channel required by the user under the control of the programmable controller 1, demodulates the tuned broadcasting signal to divide it into the video signal and the audio signal AU and outputs the divided video signal and audio signal AU. Then, the audio signal AU is transferred to the audio processing circuit (not shown) and the video signal is transferred to the first switching circuit 4.

The first switching circuit 4 selectively outputs one of the video signal from the tuner 3 and an external video signal through the video input jack VIJ to the Y/C processing circuit 5 under the control of the programmable controller 1.

The Y/C processing circuit 5 video-processes the video signal from the first switching circuit 4 or the self-video signal to be played back under the control of the programmable controller 1. Then, the video signal from the Y/C processing circuit 5 is outputted to the clamping circuit 7 which clamps the received video signal at a constant voltage level. Also, the video signal from the Y/C processing circuit 5 is received by the caption decoder 12 which detects the caption signal from the received video signal. Further, the video signal from the Y/C processing circuit 5 is received by the Y/C detector 6 which confirms output of the video signal from the Y/C processing circuit 5.

Upon receiving the video signal from the Y/C processing circuit 5, the Y/C detector 6 outputs the high control signal DH to the programmable controller 1, which indicates that the video signal from the Y/C processing circuit 5 is present. Also, the Y/C detector 6 separates vertical and horizontal synchronous signals Vsync and Hsync from the video signal from the Y/C processing circuit 5 and applies the vertical and horizontal synchronous signals Vsync and Hsync to the on-screen display unit 16.

The second switching circuit 13 normally operates to output the video signal from the clamping circuit 7 to the on-screen display unit 16. At this time, if the caption signal including the character and screen data is applied from the caption decoder 12, the second switching circuit 13 stops transferring the video signal from the clamping circuit 7 to the on-screen display unit 16 and transfers the caption signal from the caption decoder 12 to the on-screen display unit 16. Namely, if the screen data of the caption signal is applied from the caption decoder 12, it is transferred through the first and second switches 13a and 13b in the second switching circuit 13 to the on-screen display unit 16. If character data of the caption signal is also applied from the caption decoder 12, it is transferred through the second switch 13b in the second switching circuit 13 and screen data is transferred through first switch 13a and line $S_1+V_1$ to the on-screen display unit 16. If no further screen and character data of the caption signal is applied from the caption decoder 12, the operation of the second switching circuit 13 is returned to the normal state in which the video signal from the clamping circuit 7 is transferred through the first and second switches 13a and 13b in the second switching circuit 13 to the on-screen display unit 16.

On the other hand, the output signal from the on-screen display unit 16 is transferred to the RF converter 2 or to the video output jack VOJ externally. In the VCR mode, the RF converter 2 modulates the video signal including the caption signal from the buffer 17 and the audio signal from the audio processing circuit (not shown) to a broadcasting frequency required by the user and outputs the modulated video signal including caption signal and audio signal through the transmitting antenna ANT2.

As hereinbefore described, in accordance with the present invention, there is provided the caption VCR having the caption decoder, therein, for detecting the caption signal from the broadcasting signal or detecting the caption signal recorded on the VCR tape. Also, there is provided the method of displaying the caption signal from the caption decoder together with the audio signal and the video signal in the caption VCR. Therefore, according to the present invention, it is convenient for the deaf person or foreign language learner to watch a desired image containing the caption signal on the screen utilizing the caption decoder.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A caption display apparatus for a VCR, comprising:
   programmable controlling means for providing a plurality of control signals necessary to the VCR under control of a user;
   radio frequency converting means for receiving an external broadcasting signal and outputting the received broadcasting signal or a desired signal under control of said programmable controlling means;
   tuning mean for tuning an output signal from said radio frequency converting means to a broadcasting channel required by the user under control of said programmable controlling means, demodulating the tuned signal to divide it into a video signal and an audio signal and outputting the divided video signal and audio signal;
   first switching means for selectively outputting the video signal from said tuning means or an external video signal under control of said programmable controlling means;
   luminance/chrominance processing means for video-processing an output signal from said first switching means or a self-video signal to be placed back under control of said programmable controlling means;
   luminance/chrominance detecting means for outputting a desired control signal to said programmable controlling means according to whether an output signal from said luminance/chrominance processing means is present and separating vertical and horizontal synchronous signals form the output signal from said luminance/chrominance processing means if the output signal from said luminance/chrominance processing means is present;
   clamping means for clamping the output signal from said luminance/chrominance processing means at a constant voltage level;
   noise attenuating means for attenuating a noise containing int he output signal form said luminance/chrominance processing means for the purpose of easiness of decoding of a caption signal form the output signal form said luminance/chrominance processing means;
   caption decoding means receiving an output signal form said noise attenuating means and detecting the caption signal containing screen data and character data from the output signal from said noise attenuating means under control of said programmable controlling means;
   second switching means for selectively outputting on of an output signal form said clamping means and an output signal form a DC voltage supplying means for supplying a desired DC voltage to said second switching means,
   wherein said second switching means is under control of said caption decoding means and wherein said DC voltage supplying means supplies a desired DC voltage to said second switching means only when the caption signal from said caption decoding means is applied to said second switching means;
   on-screen displaying means for displaying an output signal from said second switching means under said vertical and horizontal synchronous signals of said programmable controlling means and a control of said luminance/chrominance detecting means; and
   third switching means for blocking the output signal from said caption decoding means to said second switching means under control of said programmable controlling means.

2. A caption display apparatus for a VCR, as set forth in claim 1, wherein said attenuating means includes:
   buffering means for buffering the output signal from said luminance/chrominance processing means;
   color and noise removing means for removing the color and noise contained in an output signal from said buffering means to prevent generation of an error character due to the color and noise upon decoding of the caption signal; and
   clamping and synchronization correcting means for clamping an output signal from said color and noise removing means at a constant voltage level and then correcting a synchronization of the clamped signal to suppress a horizontal vibration of a character of the caption signal to be decoded.

3. A caption display apparatus for a VCR, as set forth in claim 1, wherein said second switching means includes:
   a first switch for selectively outputting one of the output signal from said clamping means and the screen data of the caption signal from said caption decoding means under the control of said caption decoding means; and
   a second switch for selectively outputting one of an output signal from said first switch and the character data of the caption signal from said caption decoding means under the control of said caption decoding means.

4. A caption display apparatus for a VCR, as set forth in claim 1, wherein said third switching means includes:
   a third switch for blocking the character data of the caption signal from said caption decoding means to said second switch in said second switching means under the control of said programmable controlling means; and
   a fourth switch for blocking the screen data of the caption signal from said caption decoding means to said first switch in said second switching means under the control of said programmable controlling means.

5. A caption display apparatus for a VCR, as set forth in claim 1, wherein said DC voltage supplying means includes:
   a first DC voltage supplying unit for supplying a desired DC voltage to said first switch in said second switching means only when the screen data of the caption signal from said caption decoding means is applied to said first switch; and
   a second DC voltage supplying unit for supplying a desired DC voltage to said second switch in said second switching means only when the character data of the caption signal form said caption decoding means is applied to said second switch.

6. A caption display apparatus for a VCR, as set forth in claim 1, further comprising:

reverse voltage preventing means for preventing the occurrence of reverse voltages of caption control signals form said programmable controlling means.

7. A method carried out within a VCR of displaying along with a video signal a caption signal representing conversation and other audible sounds associated with the video signal in a caption VCR, comprising the steps of:
   (a) luminance/chrominance-processing for video-processing a video signal inputted to the VCR;
   (b) clamping the luminance/chrominance-processed video signal at a constant voltage level, then transmitting the clamped video signal to a display unit and continuously displaying the clamped video signal int eh display unit;
   (c) simultaneously with the clamping of the luminance/chrominance-processed video signal, continuously decoding the luminance/chrominance-processed video signal to detect a caption signal form the luminance/chrominance-processed video signal and separating a screen data signal and a character data signal present in a detected caption signal; and
   (d) when screen data of a caption signal which identifies a caption area on a screen is detected, displaying the screen data of the caption signal along with the video signal in the display unit, and when the character data of a caption signal is detected, displaying the character data within the caption area.

8. A method of displaying a caption signal in a caption VCR, as set forth in claim 7, wherein said step (a) includes the step of:
   selecting one of a demodulated broadcasting signal, an external video signal and a self-video signal to be played back and then luminance/chrominance-processing the selected video signal.

9. A method of displaying a caption signal in a caption VCR, as set forth in claim 7, wherein said step (d) includes the step of:
   returning to said step (b) if no screen data and character data of the caption signal is detected.

10. A method of displaying a caption signal in a caption VCR, as set forth in claim 7, further comprising the steps of:
   (e) adjusting a synchronization of the luminance/chrominance-processed video signal after performing said step (a); and
   (f) if said step (e) is not performed, adjusting the synchronization of the luminance/chrominance-processed video signal when the luminance/chrominance-processed video signal is displayed.

* * * * *